US008512618B2

(12) United States Patent
Boerzel et al.

(10) Patent No.: US 8,512,618 B2
(45) Date of Patent: Aug. 20, 2013

(54) PROCESS FOR THE PRODUCTION OF MOLDINGS

(75) Inventors: Heidi Boerzel, Ludwigshafen (DE); Kathrin Michl, Ludwigshafen (DE); Rainer Scheidhauer, Hassloch (DE)

(73) Assignee: BASF SE, Ludwigshafen (DE)

( * ) Notice: Subject to any disclaimer, the term of this patent is extended or adjusted under 35 U.S.C. 154(b) by 853 days.

(21) Appl. No.: 12/602,507

(22) PCT Filed: Jun. 9, 2008

(86) PCT No.: PCT/EP2008/057162
§ 371 (c)(1),
(2), (4) Date: Dec. 1, 2009

(87) PCT Pub. No.: WO2008/152018
PCT Pub. Date: Dec. 18, 2008

(65) Prior Publication Data
US 2010/0178506 A1    Jul. 15, 2010

(30) Foreign Application Priority Data

Jun. 13, 2007 (EP) .................................. 07110206

(51) Int. Cl.
*B29C 45/14* (2006.01)
(52) U.S. Cl.
USPC ............................ 264/257; 264/109; 264/122
(58) Field of Classification Search
USPC .......................................... 264/109, 122, 257
See application file for complete search history.

(56) References Cited

U.S. PATENT DOCUMENTS

| | | | |
|---|---|---|---|
| 2,282,306 A | | 5/1942 | Cross |
| 3,203,910 A | | 8/1965 | Wilson |
| 3,766,002 A | * | 10/1973 | Greif et al. .................... 162/146 |
| 4,144,123 A | | 3/1979 | Scharf et al. |
| 6,099,773 A | * | 8/2000 | Reck et al. .................... 264/109 |
| 6,287,495 B1 | * | 9/2001 | Rosthauser .................. 264/109 |
| 6,461,553 B1 | * | 10/2002 | Hansen et al. ................ 264/122 |
| 6,596,386 B1 | * | 7/2003 | Reck et al. ................. 428/292.4 |
| 7,736,559 B2 | * | 6/2010 | Rivers et al. .................. 264/109 |
| 2002/0074096 A1 | * | 6/2002 | Wierer et al. ................... 162/13 |

FOREIGN PATENT DOCUMENTS

| | | |
|---|---|---|
| DE | 25 01 123 | 7/1976 |
| DE | 40 03 172 | 8/1991 |
| DE | 199 56 420 | 3/2001 |
| EP | 0 095 233 | 11/1983 |
| EP | 0 116 930 | 8/1984 |
| EP | 0 583 086 | 2/1994 |
| EP | 0 651 088 | 5/1995 |
| EP | 1 203 648 | 5/2002 |
| EP | 1 707 665 | 10/2006 |
| WO | 97 31059 | 8/1997 |

\* cited by examiner

*Primary Examiner* — Christina Johnson
*Assistant Examiner* — Saeed Huda
(74) *Attorney, Agent, or Firm* — Oblon, Spivak, McClelland, Maier & Neustadt, L.L.P.

(57) ABSTRACT

Process for the production of a molding from particulate and/or fibrous substrates based on renewable raw materials and a formaldehyde-free, aqueous binder.

14 Claims, No Drawings

PROCESS FOR THE PRODUCTION OF MOLDINGS

The present invention relates to a molding from particulate and/or fibrous substrates based on renewable raw materials and a formaldehyde-free, aqueous binder, which molding comprises, as active constituents a) a polymer A which is composed of from 5 to 100% by weight of an ethylenically unsaturated carboxylic anhydride or of an ethylenically unsaturated dicarboxylic acid whose carboxyl groups can form an anhydride group, incorporated in the form of polymerized units, and b) an alkanolamine B which has at least 2 hydroxyl groups, the particulate and/or fibrous substrate being impregnated with the formaldehyde-free, aqueous binder, the impregnated particulate and/or fibrous substrates then being shaped to give a molding and the molding thus obtained then being subjected to a thermal treatment step, wherein from 0.01 to 5% by weight of an organic polyamine compound C, based on the total amount of the particulate and/or fibrous substrates, are applied to the particulate and/or fibrous substrates before the impregnation with the formaldehyde-free, aqueous binder, the organic polyamine compound C having a weight average molecular weight Mw of $\geqq 1000$ g/mol and having in total at least 5 primary and/or secondary amino functions.

According to WO 97/31059, the use of a formaldehyde-free, aqueous binder comprising a) a polymer which is obtained by free radical polymerization and comprises from 5 to 100% by weight of an ethylenically unsaturated acid anhydride or of an ethylenically unsaturated dicarboxylic acid whose carboxyl groups can form an anhydride group, and b) an alkanolamine having at least two hydroxyl groups, as a binder for renewable raw materials in the form of fibers, slivers or chips for the production of moldings was disclosed. However, the moldings produced according to the invention are not always completely satisfactory with regard to their water absorption and their thickness swelling under the influence of water, in particular depending on the conditions of production of moldings.

It was an object of the present invention to provide a process for the production of moldings based on particulate and/or fibrous substrates, which leads to moldings which have a lower water absorption and a smaller thickness swelling under the influence of water.

The object was surprisingly achieved by the process defined at the outset.

In the process according to the invention, an aqueous binder is used which comprises, as active constituents, a) a polymer A which is composed of from 5 to 100% by weight of an ethylenically unsaturated carboxylic anhydride or of an ethylenically unsaturated dicarboxylic acid whose carboxyl groups can form an anhydride group, incorporated in the form of polymerized units, and b) an alkanolamine B which has at least 2 hydroxyl groups.

Abovementioned binders, their preparation and their use are disclosed in WO 97/31059, page 2, line 22 to page 18, line 14. This disclosure is hereby incorporated by reference in this document.

The polymer A used according to the invention is composed of from 5 to 100% by weight, particularly from 5 to 50% by weight and particularly preferably from 10 to 40% by weight of an ethylenically unsaturated acid anhydride or of an ethylenically unsaturated dicarboxylic acid whose carboxyl groups can form an anhydride group [referred to below as monomers a)], incorporated in the form of polymerized units.

Preferred acid anhydrides are dicarboxylic anhydrides. Suitable ethylenically unsaturated dicarboxylic acids are in general those having carboxyl groups on neighboring carbon atoms. The carboxyl groups can also be present in the form of their salts, for example alkali metal or ammonium salts, in particular in the form of their sodium or potassium salts.

Preferably used monomers a) are maleic acid, maleic anhydride, itaconic acid, norbornenedicarboxylic acid, 1,2,3,6-tetrahydrophthalic acid, 1,2,3,6-tetrahydro-phthalic anhydride, the alkali metal and ammonium salts thereof or mixtures thereof. Maleic acid and maleic anhydride are particularly preferred.

In addition to the monomers a), the polymer A may also comprise from 0 to 95% by weight, preferably from 50 to 95% by weight and particularly preferably from 60 to 90% by weight of monomers b) incorporated in the form of polymerized units.

For example, the following may be used as monomers b): monoethylenically unsaturated $C_3$- to $C_{1-10}$-monocarboxylic acids (monomers $b_1$), such as, for example, acrylic acid, methacrylic acid, ethylacrylic acid, allylacetic acid, crotonic acid, vinylacetic acid, maleic monoesters, such as monomethyl maleate, mixtures thereof and alkali metal and ammonium salts thereof.

Linear 1-olefins, branched 1-olefins or cyclic olefins (monomers $b_2$), such as, for example, ethene, propene, 1-butene, isobutene, 1-pentene, cyclopentene, 1-hexene, cyclohexene, 1-octene, 2,4,4-trimethyl-1-pentene, if appropriate as a mixture with 2,4,4-trimethyl-2-pentene, 1-$C_8$-$C_{10}$-olefin mixtures, 1-dodecene, 1-$C_{12}$-$C_{14}$-olefin mixtures, 1-octadecene, 1-eicosene, 1-$C_{20}$-$C_{24}$-olefin mixtures, oligoolefins prepared by metallocene catalysis and having a terminal double bond, such as, for example, oligopropene, oligohexene and oligooctadecene, and olefins prepared by cationic polymerization and having a high α-olefin fraction, such as, for example, polyisobutene. Of course, mixtures of monomers $b_2$ may also be used.

Vinyl and allyl alkyl ethers having 1 to 40 carbon atoms in the alkyl radical, it also being possible for the alkyl radical to carry further substituents, such as a hydroxyl group, an amino or dialkylamino group or one or more alkoxylate groups (monomers $b_3$), such as, for example, methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether and the corresponding allyl ethers. Of course, mixtures of monomers $b_3$ may also be used.

Acrylamides and alkyl-substituted acrylamides (monomers $b_4$), such as, for example, acrylamide, methacrylamide, N-tert-butylacrylamide, N-methyl(meth)acrylamide. Of course, mixtures of monomers $b_4$ may also be used.

Monomers containing sulfo groups (monomers $b_5$), such as, for example, allylsulfonic acid, methallylsulfonic acid, styrenesulfonate, vinylsulfonic acid, allyloxybenzene-sulfonic acid, 2-acrylamido-2-methylpropanesulfonic acid and the corresponding alkali metal or ammonium salts thereof. Of course, mixtures of monomers $b_5$ may also be used.

$C_1$- to $C_8$-alkyl esters or $C_1$- to $C_4$-hydroxyalkyl esters of acrylic acid, methacrylic acid or maleic acid or esters of $C_1$- to $C_{18}$-alcohols, alkoxylated with from 2 to 50 mol of ethylene oxide, propylene oxide, butylene oxide or mixtures thereof, with acrylic acid, methacrylic acid or maleic acid (monomers $b_6$), such as, for example, methyl (meth)acrylate, ethyl (meth)acrylate, propyl (meth)acrylate, isopropyl (meth) acrylate, n-butyl (meth)acrylate, hexyl (meth)acrylate, 2-ethylhexyl (meth)acrylate, 2-hydroxy-ethyl (meth)acrylate, 3-hydroxypropyl (meth)acrylate, butanediol 1,4-mono (meth)-acrylate, n-butyl maleate, ethyldiglycol (meth)acrylate, methylpolyglycol (meth)acrylate (11 EO), (meth)acrylates of $C_{13}/C_{15}$-oxo alcohol reacted with 3, 5, 7, 10 or 30 mol of ethylene oxide. Of course, mixtures of monomers $b_6$ may also be used.

Alkylaminoalkyl (meth)acrylates or alkylaminoalkyl (meth)acrylamides or quaternization products (monomers $b_7$) thereof, such as, for example, 2-(N,N-dimethylamino) ethyl (meth)acrylate, 3-(N,N-dimethylamino)propyl (meth) acrylate, 2-(N,N,N-trimethyl-ammonium)ethyl (meth)acrylate chloride, 2-dimethylaminoethyl(meth)acrylamide, 3-dimethylaminopropyl(meth)acrylamide, 3-trimethylammoniumpropyl (meth)acrylamide chloride. Of course, mixtures of monomers $b_7$ may also be used.

Vinyl and allyl esters of $C_1$- to $C_{30}$-monocarboxylic acids (monomers $b_8$), such as, for example, vinyl formate, vinyl acetate, vinyl propionate, vinyl butyrate, vinyl valerate, vinyl 2-ethylhexanoate, vinyl nonoate, vinyl decanoate, vinyl pivalate, vinyl palmitate, vinyl stearate, vinyl laurate. Of course, mixtures of monomers $b_8$ may also be used.

The following may be mentioned as further monomers which, according to the invention, can be incorporated in the form of polymerized units in polymer A (monomers $b_9$): N-vinylformamide, N-vinyl-N-methylformamide, styrene, α-methyl-styrene, 3-methylstyrene, 1,3-butadiene, N-vinylpyrrolidone, N-vinylimidazole, 1-vinyl-2-methylimidazole, 1-vinyl-2-methylimidazoline, N-vinylcaprolactam, acrylonitrile, methacrylonitrile, allyl alcohol, 2-vinylpyridine, 4-vinylpyridine, diallyldimethylammonium chloride, vinylidene chloride, vinyl chloride, acrolein, methacrolein and vinylcarbazole or mixtures thereof.

Preferred monomers are acrylic acid, methacrylic acid, ethene, propene, butene, isobutene, cyclopentene, methyl vinyl ether, ethyl vinyl ether, acrylamide, 2-acrylamido-2-methylpropanesulfonic acid, vinyl acetate, styrene, butadiene and/or acrylonitrile.

Acrylic acid, methacrylic acid, ethene, acrylamide, styrene and/or acrylonitrile are particularly preferred.

Acrylic acid, methacrylic acid and/or acrylamide are very particularly preferred.

The polymers A can be prepared by customary polymerization processes, for example by mass, emulsion, suspension, dispersion, precipitation and solution polymerization. Said polymerization processes are preferably effected in the absence of oxygen, preferably in a nitrogen stream. For all polymerization methods the customary apparatuses are used, such as, for example, stirred tanks, stirred tank cascades, autoclaves, tubular reactors and kneaders. The solution, emulsion, precipitation or suspension polymerization method is preferably employed. The solution and emulsion polymerization methods are particularly preferred. The polymerization can be carried out in solvents or diluents, such as, for example, toluene, o-xylene, p-xylene, cumene, chlorobenzene, ethylbenzene, industrial mixtures of alkylaromatics, cyclohexane, industrial aliphatic mixtures, acetone, cyclohexanone, tetrahydrofuran, dioxane, glycols and glycol derivatives, polyalkylene glycols and derivatives thereof, diethyl ether, tert-butyl methyl ether, methyl acetate, isopropanol, ethanol, water or mixtures, such as, for example, isopropanol/water mixtures. Water, if appropriate with proportions of up to 60% by weight of alcohols or glycols, is preferably used as the solvent or diluent. Particularly preferably, water is used. Accordingly, the polymers A are preferably present in the form of aqueous solutions.

The polymerization can be carried out at temperatures of from 20 to 300° C., preferably from 60 to 200° C. Depending on the choice of the polymerization conditions, weight average molecular weights of from 800 to 5 000 000 g/mol, in particular from 1000 to 1 000 000 g/mol, can be established. The weight average molecular weights Mw are preferably in the range from 2000 to 400 000 g/mol. The weight average molecular weights are determined by the gel permeation chromatography familiar to the person skilled in the art.

The polymerization is preferably carried out in the presence of compounds forming free radicals. Up to 30% by weight, preferably from 0.05 to 15% by weight and particularly preferably from 0.2 to 8% by weight, based on the monomers used in the polymerization, of these compounds are required. In the case of multicomponent initiator systems (e.g. redox initiator systems), the above weight data are based on the sum of the components.

Suitable polymerization initiators are, for example, peroxides, hydroperoxides, peroxidisulfates, percarbonates, peroxyesters, hydrogen peroxide and azo compounds. Examples of initiators, which may be water-soluble or water-insoluble, are hydrogen peroxide, dibenzoyl peroxide, dicyclohexyl peroxodicarbonate, dilauroyl peroxide, methyl ethyl ketone peroxide, di-tert-butyl peroxide, acetylacetone peroxide, tert-butyl hydroperoxide, cumyl hydroperoxide, tert-butyl perneodecanoate, tert-amyl perpivalate, tert-butyl perpivalate, tert-butyl perneohexanoate, tert-butyl per-2-ethylhexanoate, tert-butyl perbenzoate, lithium, sodium, potassium and ammonium peroxodisulfate, azodiisobutyronitrile, 2,2'-azobis(2-amidinopropane) dihydrochloride, 2-(carbamoylazo) isobutyronitrile and 4,4-azobis(4-cyanovaleric acid).

The initiators may be used alone or as a mixture with one another, for example mixtures of hydrogen peroxide and sodium peroxodisulfate. For the polymerization in an aqueous medium, water-soluble initiators are preferably used.

The known redox initiator systems can also be used as polymerization initiators. Such redox initiator systems comprise at least one peroxide-containing compound in combination with a redox coinitiator, for example reducing sulfur compounds, for example bisulfites, sulfites, thiosulfates, dithionites and tetrathionates of alkali metals and ammonium compounds. Thus, combinations of peroxodisulfates with alkali metal or ammonium hydrogen sulfites may be used, e.g. ammonium peroxodisulfate and ammonium disulfite. The amount of the peroxide-containing compound relative to the redox coinitiator is from 30:1 to 0.05:1.

In combination with the initiators or the redox initiator systems, it is additionally possible to use transition metal catalysts, for example salts of iron, cobalt, nickel, copper, vanadium and manganese. Suitable salts are, for example, iron(II) sulfate, cobalt(II) chloride, nickel(II) sulfate and copper(I) chloride. Based on monomers, the reducing transition metal salt is used in a concentration of from 0.1 ppm to 1000 ppm. Thus, combinations of hydrogen peroxide with iron(II) salts can be used, such as, for example, from 0.5 to 30% by weight of hydrogen peroxide and from 0.1 to 500 ppm of Mohr's salt.

In the polymerization in organic solvents, too, redox coinitiators and/or transition metal catalysts, e.g. benzoin, dimethylaniline, ascorbic acid and complexes of heavy metals, such as copper, cobalt, iron, manganese, nickel and chromium, which are soluble in organic media, can be concomitantly used in combination with the abovementioned initiators. The amounts of redox coinitiators or transition metal catalysts usually used here are from about 0.1 to 1000 ppm, based on the amounts of monomers used for the polymerization.

If the reaction mixture is prepolymerized at the lower limit of the temperature range suitable for the polymerization and then completely polymerized at a higher temperature, it is expedient to use at least two different initiators which decompose at different temperatures so that a sufficient concentration of free radicals is available in each temperature range.

In order to prepare polymers A having a low average molecular weight, it is often expedient to carry out the polymerization in the presence of so-called free radical chain regulators. Customary free radical chain regulators, such as, for example, organic compounds comprising SH groups, such as 2-mercaptoethanol, 2-mercaptopropanol, mercaptoacetic acid, tert-butyl mercaptan, n-octyl mercaptan, n-dodecyl mercaptan and tert-dodecyl mercaptan, $C_1$- to $C_4$-aldehydes, such as formaldehyde, acetaldehyde, propionaldehyde, hydroxylammonium salts, such as hydroxylammonium sulfate, formic acid, sodium bisulfite or isopropanol, can be used for this purpose. The free radical chain regulators are used in general in amounts of from 0.1 to 10% by weight, based on the monomers. The average molecular weight can also be influenced by the choice of the solvent used. Thus, the polymerization in the presence of diluents having benzylic H atoms leads to a reduction in the average molecular weight by chain transfer.

In order to prepare higher molecular weight polymers A, it is often expedient to work in the presence of crosslinking agents during the polymerization. Such crosslinking agents are compounds having two or more ethylenically unsaturated groups, such as, for example, diacrylates or dimethacrylates of at least dihydric saturated alcohols, such as, for example, ethylene glycol diacrylate, ethylene glycol dimethacrylate, 1,2-propylene glycol diacrylate, 1,2-propylene glycol dimethacrylate, butanediol 1,4-diacrylate, butanediol 1,4-dimethacrylate, hexanediol diacrylate, hexanediol dimethacrylate, neopentylglycol diacrylate, neopentylglycol dimethacrylate, 3-methylpentanediol diacrylate and 3-methylpentanediol dimethacrylate. The acrylates and methacrylates of alcohols having more than 2 OH groups can also be used as crosslinking agents, e.g. trimethylolpropane triacrylate or trimethylolpropane trimethacrylate. A further class of crosslinking agents comprises diacrylates or dimethacrylates of polyethylene glycols or polypropylene glycols having molecular weights of in each case from 200 to 9000 g/mol. Polyethylene glycols or polypropylene glycols which are used for the preparation of the diacrylates or dimethacrylates preferably have a molecular weight of in each case from 400 to 2000 g/mol. In addition to the homopolymers of ethylene oxide or propylene oxide, block copolymers of ethylene oxide and propylene oxide or copolymers of ethylene oxide and propylene oxide which comprise the ethylene oxide and propylene oxide units in random distribution may also be used. The oligomers of ethylene oxide or propylene oxide are also suitable for the preparation of the crosslinking agents, e.g. diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Vinyl acrylate, vinyl methacrylate, vinyl itaconate, divinyl adipate, butanediol divinyl ether, trimethylolpropane trivinyl ether, allyl acrylate, allyl methacrylate, pentaerithrityl triallyl ether, triallylsaccharose, pentaallylsaccharose, pentaallylsucrose, methylenebis(meth)acrylamide, divinylethyleneurea, divinylpropyleneurea, divinylbenzene, divinyldioxane, triallyl cyanurate, tetraallylsilane, tetravinylsilan and bis- or polyacryloylsiloxanes. The crosslinking agents are preferably used in amounts of from 10 ppm to 5% by weight, based on the monomers to be polymerized.

If the emulsion, precipitation, suspension or dispersion polymerization method is employed, it may be advantageous to stabilize the polymer droplets or polymer particles by surface-active assistants. Emulsifiers or protective colloids are typically used for this purpose. Anionic, nonionic, cationic and amphoteric emulsifiers are suitable. Anionic emulsifiers are, for example, alkylbenzenesulfonic acids, sulfonated fatty acids, sulfosuccinates, fatty alcohol sulfates, alkylphenolsulfates and fatty alcohol ether sulfates. For example, alkylphenol ethoxylates, primary alcohol ethoxylates, fatty acid ethoxylates, alkanolamide ethoxylates, fatty amine ethoxylates, EO/PO block copolymers and alkylpolyglucosides can be used as nonionic emulsifiers. For example the following are used as cationic or amphoteric emulsifiers: quaternized amine alkoxylates, alkylbetaines, alkylamidobetaines and sulfobetaines.

Typical protective colloids are, for example, cellulose derivatives, polyethylene glycol, polypropylene glycol, copolymers of ethylene glycol and propylene glycol, polyvinyl acetate, polyvinyl alcohol, polyvinyl ether, starch and starch derivatives, dextran, polyvinylpyrrolidone, polyvinylpyridine, polyethyleneimine, polyvinylimidazole, polyvinylsuccinimide, polyvinyl-2-methylsuccinimide, polyvinyl-1,3-oxazolid-2-one, polyvinyl-2-methylimidazoline and copolymers comprising maleic acid or maleic anhydride, as described, for example, in DE-A 2501123.

The emulsifiers or protective colloids are usually used in concentrations of from 0.05 to 20% by weight, based on the monomers.

If the polymerization is effected in aqueous solution or dilution, the monomers can be completely or partly neutralized by bases before or during the polymerization. Suitable bases are, for example, alkali metal or alkaline earth metal compounds, such as, for example, sodium hydroxide, potassium hydroxide, calcium hydroxide, magnesium oxide, sodium carbonate but also ammonia; primary, secondary and tertiary amines, such as ethylamine, propylamine, monoisopropylamine, monobutylamine, hexylamine, ethanolamine, dimethylamine, diethylamine, di-n-propylamine, tributylamine, dimethoxyethylamine, 2-ethoxyethylamine, 3-ethoxypropylamine, dimethylethanol-amine or morpholine.

Furthermore, polybasic amines, such as, for example ethylenediamine, 2-diethylaminoethylamine, 2,3-diaminopropane, 1,2-propylenediamine, dimethylaminopropylamine, neopentanediamine, hexamethylenediamine, 4,9-dioxadodecane-1,12-diamine, polyethyleneimine or polyvinylamine, can also be used for neutralization.

Preferably, ammonia or the alkanolamines B triethanolamine and diethanolamine are used for partial or complete neutralization of the ethylenically unsaturated carboxylic acids before or during the polymerization.

Particularly preferably, the ethylenically unsaturated carboxylic acids are not neutralized before and during the polymerization. Preferably, no neutralizing agent, apart from the alkanolamine B, is added even after the polymerization. The polymerization can be carried out continuously or batchwise by a multiplicity of variants. Frequently, a part of the monomers is initially taken in the polymerization vessel, if appropriate in a suitable diluent or solvent and if appropriate in the presence of an emulsifier, of a protective colloid or of further assistants, and blanketed with an inert atmosphere and the temperature is increased until the desired polymerization temperature is reached. It is however, also possible to initially take only a suitable diluent. The free radical initiator, further monomers and other assistants, such as, for example, free radical chain regulators or crosslinking agents, in each case if appropriate in a diluent, are metered in within a defined period. The feed times may be chosen to be of different lengths. For example, another feed time may be chosen for the initiator feed than for the monomer feed.

If the polymer A is obtained by a solution polymerization process in water, it is usually not necessary to separate off the solvent. If it is nevertheless desired to isolate the polymer A as a solid, for example, a spray drying can be carried out.

If the polymer A is prepared by a solution, precipitation or suspension polymerization method in a steam-volatile solvent or solvent mixture, the solvent can be separated off by passing in steam in order thus to obtain an aqueous solution or dispersion. The polymer A can also be separated from the organic diluent by a distillation or drying process.

Preferably, the polymer A is used in the form of an aqueous dispersion or solution, having a solids content of, preferably, from 10 to 80% by weight, in particular from 40 to 65% by weight.

Polymer A can also be obtained by grafting maleic acid or maleic anhydride or a monomer mixture comprising maleic acid or maleic anhydride onto a grafting base. Suitable grafting bases are, for example, monosaccharides, oligosaccharides, modified polysaccharides and alkylpolyglycol ethers. Such graft polymers are disclosed, for example, in DE-A 40 03 172 or EP-A 116 930.

Those alkanolamines which have at least 2 hydroxyl groups are used as alkanolamine B. Alkanolamines of the formula (I)

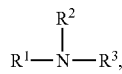

where $R^1$ is an H atom, a $C_1$-$C_{10}$-alkyl group or a $C_2$-$C_{10}$-hydroxyalkyl group and $R^2$ and $R^3$ are a $C_2$-$C_{10}$-hydroxyalkyl group, are preferred.

Particularly preferably, $R^2$ and $R^3$, independently of one other, are a $C_2$-$C_5$-hydroxy-alkyl group and $R^1$ is an H atom, a $C_1$-$C_5$-alkyl group or a $C_2$-$C_5$-hydroxyalkyl group.

In particular, diethanolamine, triethanolamine, diisopropanolamine, triisopropanol-amine, methyldiethanolamine, butyldiethanolamine and methyldiisopropanolamine may be mentioned as compounds of the formula (I). Triethanolamine is particularly preferred.

For the preparation of the formaldehyde-free, aqueous binders the polymer A and the alkanolamine B are preferably used in a ratio relative to one another such that the molar ratio of carboxyl groups of the polymer A to the hydroxyl groups of the alkanolamine B is from 20:1 to 1:1, preferably from 8:1 to 5:1 and particularly preferably from 5:1 to 1.7:1 (the anhydride groups are calculated here as 2 carboxyl groups).

The preparation of a formaldehyde-free, aqueous binder is effected, for example, in a simple manner by adding the alkanolamine B to the aqueous dispersion or solution of the polymer A.

The abovementioned aqueous binders preferably comprise less than 1.5% by weight, in particular less than 1.0% by weight, particularly preferably less than 0.5% by weight and very particularly preferably less than 0.3% by weight, in particular less than 0.1% by weight, based on the sum of polymer A and alkanolamine B, of a reaction accelerator comprising phosphorus. Reaction accelerators comprising phosphorus are disclosed, for example, in EP-A 651 088 and EP-A 583 086. These are in particular alkali metal hypophosphites, phosphites, polyphosphates or dihydrogen phosphates, polyphosphoric acid, hypophosphoric acid, phosphoric acid, alkylphosphinic acid or oligomers or polymers of these salts and acids.

The aqueous binders preferably comprise no reaction accelerators comprising phosphorus or no amounts of a compound comprising phosphorus which are effective for reaction acceleration. The binders according to the invention can, however, comprise an esterification catalyst, such as, for example, sulfuric acid or p-toluene-sulfonic acid or titanates or zirconates.

However, the aqueous binders may also comprise further additives suitable for the use intended in each case. For example, dyes, pigments, biocides, water repellents, wetting agents, plasticizers, thickeners, adhesion promoters, reducing agents and transesterification catalysts familiar to the person skilled in the art are suitable.

The process according to the invention is suitable for all particulate and/or fibrous substrates based on renewable raw materials, such as, in particular, sisal fibers, jute fibers, flax fibers, coconut fibers, banana fibers, hemp fibers and/or kenaf fibers and slivers, chips, granules (mean particle size: from 0.5 to 8 mm) and/or dusts (mean particle size: from 0.1 to 0.5 mm) of cork or wood, such as, in particular spruce, pine or eucalyptus wood. Of course, the term fibrous substrate is also intended to comprise the fiber webs obtainable from said fibers, in particular fiber webs present in mechanically consolidated form, for example so-called needled fiber webs.

The process according to the invention is distinguished in that from 0.01 to 5% by weight of an organic polyamine compound C, based on the total amount of the particulate and/or fibrous substrates, are applied to the particulate and/or fibrous substrate before the impregnation with the formaldehyde-free, aqueous binder, the organic polyamine compound C having a weight-average molecular weight Mw of $\geq 1000$ g/mol and having in total at least 5 primary and/or secondary amino functions.

According to the invention, all organic polyamine compounds which have a weight average molecular weight Mw$\geq 1000$ g/mol and have in total at least 5 primary and/or secondary amino functions can be used as polyamine compound C. Advantageously, the weight average molecular weight Mw of the polyamine compound C is in the range of $\geq 2000$ and $\leq 5\,000\,000$ g/mol and particularly advantageous in the range of $\geq 5000$ and $\leq 3\,000\,000$ g/mol, the determination of the greater average molecular weight Mw being effected by gel permeation chromatography.

Advantageously, the polyamine compound C has on average, per 1000 molecular weight units, in total at least 10 and particularly advantageously at least 20 primary and/or secondary amino functions. The polyamine compound C is advantageously selected from the group consisting of polyethylenimines, polyallylamines, polyvinylamines, partly hydrolyzed polyvinylformamides and/or polyamidoamines. The preparation of the abovementioned compounds is familiar to the person skilled in the art. Thus, the preparation of polyethylenimines by acid-catalyzed reaction of ethylenimine is disclosed, for example, in U.S. Pat. No. 2,282,306 or U.S. Pat. No. 3,203,910, the preparation of polyallylamines by radical polymerization of allylammonium compounds is disclosed, for example, in EP-A 95 233, the preparation of polyvinylamines or of partly hydrolyzed polyvinylformamides by complete or partial acid- or base-catalyzed hydrolysis of polyvinylformamides is disclosed, for example, in Gu et al., J. Appl. Polym. Sci., 2002 (86), pages 3412 to 3419, and the preparation of polyamidoamines starting from dicarboxylic acids having 4 to 10 carbon atoms, such as maleic acid, succinic acid, glutaric acid, adipic acid, suberic acid, sebacic acid or terephthalic acid, and polyalkylenepolyamines having from 3 to 10 primary or secondary amino groups, such as diethylenetriamine, triethylenetetramine, dipropylenetriamine, tripropylene-tetramine, dihexamethylenetriamine, N-3-aminopropylethylenediamine and/or bis(N,N'-3-aminopropyl)ethylenediamine, is disclosed, for example, in U.S. Pat. No. 4,144,123.

According to the invention, polyamine compounds C which have a solubility of 5 g, preferably advantageously $\geq$10 g and particularly advantageously $\leq$20 g per 100 g of demineralized water at 20° C. and 1 atm (=1.013 bar absolute) are advantageously used.

The application of the polyamine compound C to the particulate and/or fibrous substrate can be effected in principle in the form of the pure polyamine compound C itself or in the form of the solution or dispersion thereof in an organic solvent or in water. Advantageously, the application of the polyamine compound C is effected in the form of an aqueous solution. The aqueous solutions of the polyamine compound C frequently have a polyamine compound C content of $\geq$2 and $\leq$250 g/l and often $\geq$4 and $\leq$150 g/l.

The method of application of the polyamine compound C to the particulate and/or fibrous substrate is not critical and is familiar to the person skilled in the art and is effected, for example, by impregnation or by spraying of the particulate and/or fibrous substrates with the polyamine compound C or the solution or dispersion thereof. The organic polyamine compound C is particularly advantageously applied in the form of an aqueous solution. Before the subsequent impregnation with the formaldehyde-free, aqueous binder, the particulate and/or fibrous substrate coated with the polyamine compound C can, if required, be subjected to a drying step. The drying is advantageously effected at a temperature in the range of $\geq$50 and $\leq$150° C. and of $\geq$80 and $\leq$120° C. If the polyamine compound C or the solution or dispersion thereof is sucked up or absorbed by the particulate and/or fibrous substrate owing to the porous surface structure thereof, a drying step can be dispensed with.

According to the invention, the amount of the polyamine compound C applied to the particulate and/or fibrous substrate is from 0.01 to 5% by weight, advantageously from 0.05 to 2% by weight and particularly advantageously from 0.1 to 1.5% by weight, based in each case on the total amount of particulate and/or fibrous substrate.

After the application of the polyamine compound C to the particulate and/or fibrous substrate these treated substrates are, according to the invention, impregnated with the formaldehyde-free, aqueous binder, these impregnated particulate and/or fibrous substrates are shaped to give a molding and the molding thus obtained is then subjected to a thermal treatment step.

The method of impregnation of the particulate and/or fibrous substrates treated with the polyamine compound C with the formaldehyde-free, aqueous binder is not critical and is familiar to the person skilled in the art and is effected, for example, by impregnation or by spraying of the pretreated particulate and/or fibrous substrates with the formaldehyde-free, aqueous binder. The amount of aqueous binder is chosen so that the amount of binder, formed from polymer A and alkanolamine B (calculated as solid), is from 1 to 50% by weight, advantageously from 5 to 40% by weight and particularly advantageously from 8 to 35% by weight, based in each case on the particulate and/or fibrous substrate.

After the impregnation, the particulate and/or fibrous substrate is brought into the desired form, for example by placing in a heatable press or mold, and this is then dried or cured in a manner familiar to the person skilled in the art.

Frequently, the drying of the shape obtained is effected in two drying stages, the first drying stage being effected at a temperature of $\leq$100° C., preferably $\geq$25 and $\leq$95° C. and particularly preferably $\geq$60 and $\leq$90° C. and the second drying stage at a temperature $\geq$110° C., preferably $\geq$120 and $\leq$170° C. and particularly preferably $\geq$140 and $\leq$160° C.

The first drying stage is advantageously effected in such a way that drying is carried out at a temperature of $\leq$100° C. until the mold is obtained, which frequently does not yet have its final shape (so-called semifinished product), has a residual moisture content of $\leq$15% by weight, preferably $\leq$12% by weight and particularly preferably $\leq$10% by weight. The residual moisture content is determined by first weighing the resulting molding at room temperature, then drying it for 2 minutes at 130° C. and then cooling it and weighing it again at room temperature. The residual moisture content corresponds to the difference between the weights of the molding before and after the drying process, based on the weight of the molding before the drying process, multiplied by the factor 100.

This unfinished product thus obtained is still moldable after heating to a temperature of 100° C. and can be brought into the final shape of the desired molding at this temperature.

The subsequent second drying stage is advantageously effected in such a way that the semifinished product is heated at a temperature of $\geq$110° C. until it has a residual moisture content of $\leq$3% by weight, preferably $\leq$1% by weight and particularly preferably $\leq$0.5% by weight, the binder frequently curing as a result of a chemical reaction.

Frequently, the molding is produced by a procedure in which the semifinished product is brought into the final shape in a compression mold in the above-mentioned temperature ranges and is cured.

The pressures used during the production of the molding are not critical and are familiar to the person skilled in the art and are in general from 1 to 1000 bar, advantageously from 2 to 500 bar and in particular from 10 to 200 bar (gauge pressure). It is frequently advantageous to work in pressure ranges in which phases of superatmospheric pressure alternate with phases of atmospheric pressure [1 atm (absolute)] or reduced pressure [<1 atm (absolute); for water removal].

However, it is of course also possible to effect the first (drying) and the second drying stage (curing) of the molding in one operation, for example in a compression mold.

According to the invention, it is important that, by application of the polyamine compound C to the particulate and/or fibrous substrates, the temperature required for the curing of the binder, formed from polymer A and alkanolamine B, is substantially lower in comparison with particulate and/or fibrous substrate to which no polyamine compound C is applied, without adversely effecting strengths, water absorption, thickness swelling, etc., resulting in an energy saving and hence cost saving in the production of the moldings. Of course, it is alternatively also possible substantially to reduce the curing times of the moldings at a temperature customary for the binder without adversely effecting strengths, water absorption, thickness swelling etc., by the application of the polyamine compound C to the particulate and/or fibrous substrates.

The moldings obtainable by the process according to the invention have a low water absorption and a small thickness swelling under the influence of water if they were produced at a relatively low temperature. The moldings according to the invention may be, for example, sheets or web-like shaped structured which are used, for example, as interior automotive parts, such as, for example, interior door claddings, dashboard supports, rear shelves, etc.

The invention is to be explained with reference to the following nonlimiting examples.

EXAMPLE 1

1000 g of spruce wood fibers were homogeneously mixed at from 20 to 25° C. (room temperature) with a 100 g of a 10% strength by weight aqueous polyvinylamine solution (Mw: 750 000 g/mol; Luredur® VI; brand of BASF Aktiengesellschaft, active substance concentration 21% by weight, diluted to 10% by weight with demineralized water), then dried for 40 minutes in a through-circulation oven at 90° C. and then cooled to room temperature. 100 g of the spruce wood fibers thus treated was sprayed at room temperature by spray application in a Lödige mixer with 10 g of a 50% by weight aqueous solution of a maleic anhydride/acrylic acid copolymer/triethanolamine mixture (100/30 [solid/solid]) and homogeneously mixed. The moist spruce wood fibers thus treated were sprinkled homogeneously by hand to give a 30×30 cm matt, compressed for 1 minute with a 5 kg weight having a flat 30×30 cm contact surface for better handling and then pressed in a hot press at 140° C. for 15 seconds at 50 bar (gauge pressure), followed by an aeration stroke (0 bar) lasting 10 seconds, followed by pressing for 45 seconds at 140° C. and 200 bar (gauge pressure). Thereafter, the wood fiber matt was cooled to room temperature.

EXAMPLE 2

A needled 30×30 cm natural fiber mat of 30 parts hemp/70 parts kenaf, having a weight per unit area of 1200 g/m², was immersed in a 10% strength by weight aqueous polyvinylamine solution (Luredur® VI, diluted to a polyvinylamine content of 10% by weight with demineralized water) and the amount applied was adjusted to 10.8 g of polyvinylamine solution by squeezing out with a padding mangle (corresponding to 1% by weight of polyvinylamine, based on the weight of the natural fiber mat). Thereafter, the moist natural fiber mat was dried in a through-circulation oven for 40 minutes at 90° C. and then cooled to room temperature. The pretreated mat was then impregnated by means of a padding mangle at 4 bar (gauge pressure) with a 50% by weight aqueous solution of a maleic anhydride/acrylic acid copolymer/triethanolamine mixture (100/30 [solid/solid]), the amount of binder being adjusted to 10.8 g of aqueous binder solution (corresponding to a binder content of 5% by weight (solid), based on the weight of the natural fiber mat) by squeezing out. The binder-containing natural fiber mat was then pressed in a hot press first for 15 seconds at 140° C. and 50 bar (gauge pressure), followed by an aeration stroke lasting 10 seconds (at 0 bar), and then pressed for 45 seconds at 140° C. and 200 bar (gauge pressure).

COMPARATIVE EXAMPLE 1 (CE1)

The production of Comparative Example 1 was effected analogously to Example 1, except that the impregnation with the polyvinylamine was dispensed with and the spruce wood fibers were mixed directly with the 50% strength by weight aqueous solution of a maleic anhydride/acrylic acid copolymer/triethanolamine mixture (100/30 [solid/solid]).

COMPARATIVE EXAMPLE 2 (CE2)

The production of Comparative Example 2 was effected analogously to Example 2, except that the impregnation with the polyvinylamine was dispensed with and the natural fiber mat was impregnated directly with the 50% strength by weight aqueous solution of a maleic anhydride/acrylic acid copolymer/triethanolamine mixture (100/30 [solid/solid]).

Investigations of Performance Characteristics

Pieces of defined size were punched out from the fiber mats produced in the Examples/Comparative Examples, and the water absorption, the thickness swelling (sample size 5×5 cm in each case), flexural strengths and moduli of elasticity (sample size 14×5 cm for wood fiber composite and 10×5 cm for fiber composite) were determined with said pieces. The corresponding results are summarized in Table 1.

The water absorption and the thickness swelling were generally determined according to DIN 52351.

The flexural strengths were determined according to DIN 178 (Example 1 and CE1 at 23° C.) or DIN 310 (Example 2 and CE 2 at 23° C. and Example 1 and CE1 at 120° C.) and the moduli of elasticity according to DIN 310 (Example 1 and CE1 at 120° C.).

TABLE 1

Results of investigations of the performance characteristics

|  | Example 1 | Example 2 | CE 1 | CE 2 |
|---|---|---|---|---|
| Water absorption after 2 hours [% by weight | 96 | 72 | 180 | 114 |
| Water absorption after 24 hours [% by weight] | 103 | 85 | 183 | 123 |
| Thickness swelling after 2 hours [%] | 65 | 57 | 120 | 139 |
| Thickness swelling after 24 hours [%] | 74 | 68 | 146 | 157 |
| Flexural strengths at 23° C. [N/mm²] | 33 | 52 | 29 | 47 |
| Flexural strengths at 120° C. [N/mm²] | 19 | n.m | 13 | n.m. |
| Modulus of elasticity at 120° C. [N/mm²] | 1748 | n.m. | 1452 | n.m. |

We claim:
1. A process for production of a molding:
the molding comprising:
a renewable raw material comprising at least one of a particulate substrate and a fibrous substrate and
a formaldehyde-free, aqueous binder,
wherein the binder comprises:
a) a polymer A having from 5 to 100% by weight of an ethylenically unsaturated carboxylic anhydride or of an ethylenically unsaturated dicarboxylic acid whose carboxyl groups are capable of forming an anhydride group, incorporated as polymerized units, and
b) an alkanolamine B which has at least 2 hydroxyl groups,
wherein the process comprises:
applying from 0.01 to 5% by weight of an organic polyamine compound C, based on the total amount of the renewable raw material, to the renewable raw material to obtain a mixture;
impregnating the mixture with the formaldehyde-free, aqueous binder,
shaping the impregnated mixture to a molding and
subjecting the molding to a thermal treatment,
wherein
a weight average molecular weight Mw of the organic polyamine compound C is greater than or equal to 1000 g/mol and the organic polyamine compound C comprises at least a total of 5 primary and secondary amino functions.

2. The process according to claim 1, wherein the organic polyamine compound C is applied in the form of an aqueous solution.

3. The process according to claim 1, wherein the polyamine compound C is selected from the group consisting of a polyethyleneimine, a polyallylamine, a polyvinylamine, a partly hydrolyzed polyvinylformamide and a polyamidoamine.

4. The process according to claim 1, wherein the thermal treatment is conducted at a temperature of from 110 to 170° C.

5. The process according to claim 1, wherein a water solubility of the polyamine compound C is at least 5 g per 100 g of demineralized water at 20° C. and 1 atm pressure (12; 1-4).

6. The process according to claim 1, wherein a molar ratio of carboxyl groups of the polymer A to the hydroxyl groups of the alkanolamine B is from 20:1 to 1:1.

7. The process according to claim 1, wherein an amount of binder is from 5 to 40% by weight, based on the renewable raw material.

8. The process according to claim 1, wherein the renewable raw material comprises at least one selected from the group consisting of a sisal fiber, a jute fiber, a flax fiber, a coconut fiber, a banana fiber, a hemp fiber, a kenaf fiber, a sliver, a chip, a wood granule or dust and cork.

9. The process according to claim 1, wherein the thermal treatment comprises first drying the molding at a temperature of 100° C. or less to obtain a semifinished product and then heating the semifinished product at a temperature of from 110° C. to 160° C.

10. The process according to claim 9, wherein the heating of the semifinished product is conducted in a compression mold.

11. The process according to claim 1, wherein an average content of primary and secondary amine groups per 1000 molecular weight units of the polyamine compound C is at least 10 groups.

12. The process according to claim 1, wherein the weight average molecular weight of the polyamine compound C is from 5000 to 3,000,000 g/mol.

13. The process according to claim 1, wherein the aqueous binder is free of a compound comprising phosphorous.

14. The process according to claim 1, wherein the aqueous binder further comprises a component selected from the group consisting of an esterification catalyst, a dye, a pigment, a biocide, a water repellant, a wetting agent, a plasticizer, a thickener, an adhesion promoter and a reducing agent.

* * * * *